324-77 SEARCH ROOM

Feb. 5, 1963 D. L. JAFFE 3,076,932

SIGNAL RECOGNITION AND IDENTIFICATION SYSTEM

Filed Sept. 23, 1959 3 Sheets-Sheet 1

INVENTOR.
D. LAWRENCE JAFFE
BY Darby & Darby
ATTORNEYS

Feb. 5, 1963 D. L. JAFFE 3,076,932

SIGNAL RECOGNITION AND IDENTIFICATION SYSTEM

Filed Sept. 23, 1959 3 Sheets-Sheet 2

INVENTOR.
D. LAWRENCE JAFFE
BY Darby & Darby
ATTORNEYS

Feb. 5, 1963 D. L. JAFFE 3,076,932

SIGNAL RECOGNITION AND IDENTIFICATION SYSTEM

Filed Sept. 23, 1959 3 Sheets-Sheet 3

INVENTOR.
D. LAWRENCE JAFFE
BY Darby & Darby
ATTORNEYS

United States Patent Office 3,076,932
Patented Feb. 5, 1963

3,076,932
SIGNAL RECOGNITION AND IDENTIFICATION SYSTEM

David Lawrence Jaffe, Great Neck, N.Y., assignor to Polarad Electronics Corporation, Long Island City, N.Y., a corporation of New York Filed Sept. 23, 1959, Ser. No. 841,879
13 Claims. (Cl. 324—77)

This invention relates to the recognition and identification of non-recurrent signals and more particularly to the control of electrical and mechanical apparatus by non-recurrent verbal information.

This application is a continuation-in-part of my co-pending Application S.N. 822,674, filed June 24, 1959, entitled Automatic Spectrum Identification System, which application is in turn a continuation-in-part of my co-pending application S.N. 790,209, filed January 30, 1959, and entitled Automatic Spectrum Identification System, which is now abandoned.

In many applications it is desirable to convert non-recurring verbal information and other non-recurring signals into signals which are capable of controlling electrical or mechanical devices. One such application is in the field of typing or printing where a printing device, such as a typewriter, lintoype machine, teleprinter, etc. is to be controlled by and caused to directly print the verbal information supplied to it. Another application is in the computation field wherein a computer, an electronc or electromechanical calculating machine, etc. is to be directly controlled by verbal commands given by an operator. It may also be desirable to control other types of machines by the use of non-recurring signals such as sounds or verbal information.

The present invention is directed to a system for converting non-recurring signals such as sounds or verbal information into electrical signals which are identifiable and capable of controlling a printing device, computer, or any other type of electrical or mechanical apparatus. In the present invention non-recurring sounds or verbal information, which are to be printed or used to control a computer by directing it to perform certain operations are supplied to the system. Each bit of non-recurring information, a bit being a particular sound, or a spoken word, syllable, or letter, is stored in a separate reiterator which repeatedly reproduces its stored bit of information. The repeated bits of non-recurring information are successively resolved into their characteristic amplitude-frequency spectra and the frequency components of these amplitude-frequency spectra are normalized in amplitude in accordance with a reference level. The frequency components of the normalized spectra which are representative of the non-recurring bits of information, are then converted into electrical signals of the analog or digital type which are identified and used to operate electrical or mechanical apparatus.

It is therefore an object of this invention to provide a system for controlling electrical or mechanical apparatus in response to non-recurring information.

Another object of this invention is to provide a system for directly printing verbal information.

An additional object of the invention is to provide a system for the identification of non-recurring information.

A further object of the present invention is to provide a system for converting non-recurring information into electrical signals representative of the spectra of the information and using these electrical signals to control electrical or mechanical apparatus.

Another object of the invention is to provide a system for the identification of non-recurring information lying in a different frequency range and being of different pitch.

Yet another object of this invention is to provide a system in which non-recurring bits of information are stored, then converted into their corresponding amplitude-freqency spectra, the amplitude of the frequency components of the spectra being normalized to a reference level, then electrical signals are formed which are representative of the normalized frequency components of the spectra, and these signals are used to control electrical or mechanical apparatus.

Other objects and advantages of the present invention will become more apparent upon reference to the following specification and annexed drawings in which.

As is well known, all transmittable intelligence, for example, simple or complex sounds, may be broken down into the frequency components which form their characteristic amplitude-frequency spectra. This is accomplished mathematically by a Fourier analysis and in practice the spectra of signals are formed by such well known devices as "real time" or panoramic spectrum analyses. Every signal has such a spectrum and for a particular signal this spectrum is invariant. In the case of sound signals, since the spectra for different sounds are invariant, the sounds may be distinguished from one another solely on the basis of the characteristic amplitude-frequency spectra. The same is true for other types of signals.

Figures 1, 2:
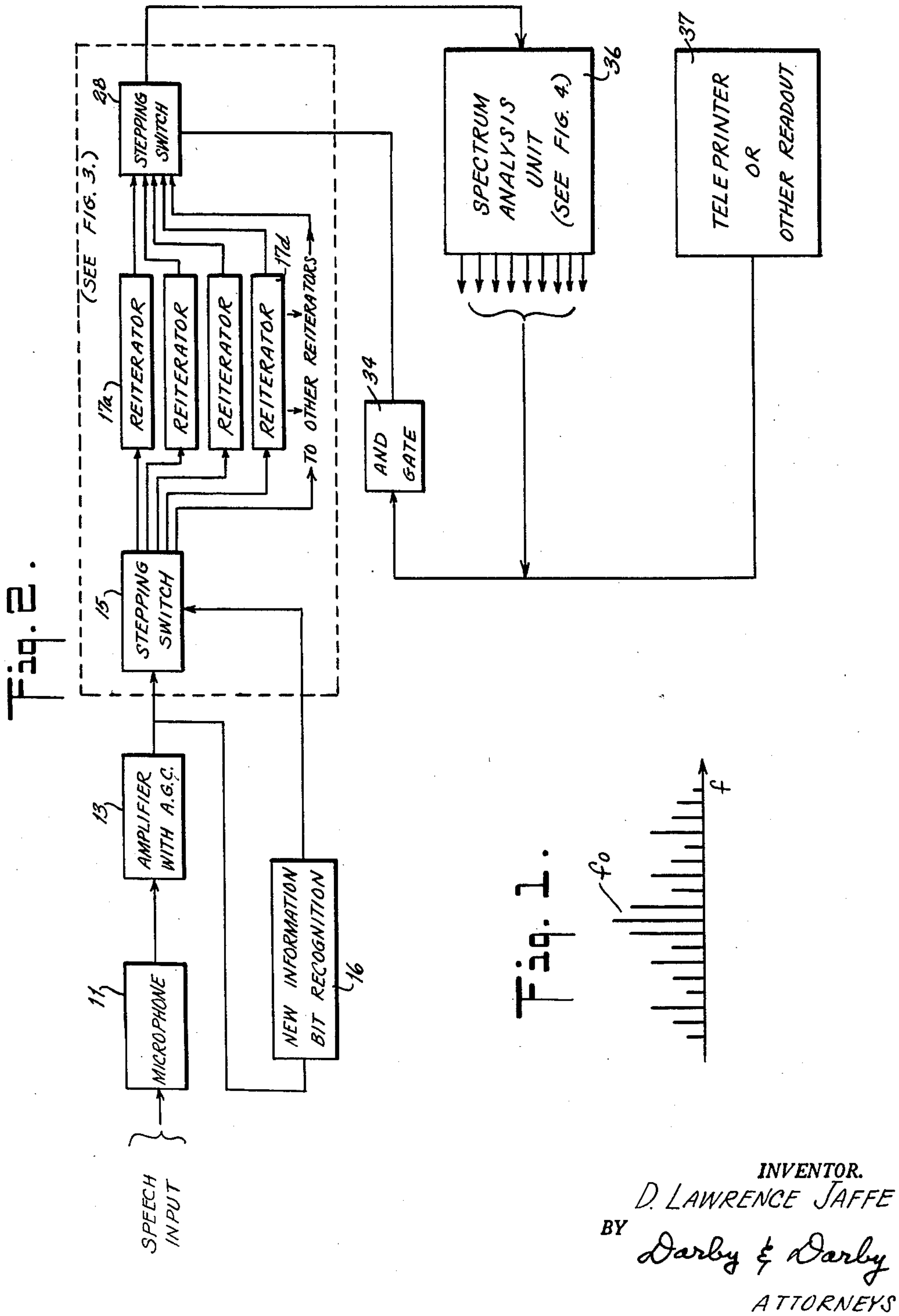
FIG. 1 shows a typical amplitude-frequency spectrum for a signal.
FIG. 2 shows a schematic block diagram of the system of the present invention.

FIG. 1 shows a typical spectrum of a signal in which the magnitudes of the frequency components forming the spectrum are plotted as a function of frequency. The spectrum of FIG. 1 has a center frequency component $f_0$ and a number of other frequency components lying in a frequency range on each side of the center frequency component $f_0$. In the spectrum shown the center frequency component of $f_0$ has the maximum amplitude and each of the other frequency components is of lesser amplitude. The system of the present invention is not restricted in operation to a symmetrical type of spectrum as shown in FIG. 1, since it operates in response to any type of spectrum in any frequency range.

Each signal such as a sound, syllable, or word may be resolved into its characteristics amplitude-frequency spectrum, similar to the spectrum shown in FIG. 1. The frequency components of various signals have different amplitudes and/or the frequency distribution of these frequency components is different. The system of the present invention makes use of the fact that each signal produces a different amplitude-frequency spectrum. These different spectra are processed into electrical signals which are used to operate an electrical or mechanical device in accordance with the characteristics of the spectra.

Referring to FIG. 2, the overall block diagram of the system of the present invention is shown. While the preferred embodiment of the system is described with respect to having non-recurring speech signals as an input, it should be realized that other types of non-recurring sounds or higher frequency signals may also be used. The speech input which comprises successive, non-recurring (spoken once) bits of information in the form of letters, syllables or words spoken by the person controlling the system, is picked up by a high quality microphone 11 and converted into a corresponding electrical signal. When other types of signals are used, suitable transducers for these signals are provided. The microphone 11 preferably has a flat frequency response over the entire audio frequency range so that it does not change the spectrum of the signal. The output signal from the microphone 11 is supplied to an automatic gain control type of amplifier 13. The amplifier 13 may be any of the conventional types which operates at audio frequencies. The automatic gain control amplifier 13 provides a substantially constant input signal to the remainder of the system. Automatic gain control amplifier circuits are well known in the art and need no further explanation here.

The output of the amplifier 13 is applied to the single input of a stepping switch 15 which has a plurality of outputs. The stepping switch 15 may be any suitable type of electronically or mechanically operated switch in which the signal applied to the switch input is successively placed on different output terminals as the switch is stepped. The stepping switch 15 is operated in response to signals produced by a new information bit recognition circuit 16 which serves to advance the stepping switch to a new output position every time a new bit of information is picked up by the microphone 11. The recognition circuit 16 may, if desired, be operated manually to advance the switch 15 whenever a new bit of information is heard. In one embodiment of the invention the recognition circuit 16 operates automatically in response to pauses between the words to produce a signal for advancing the stepping switch 15. A circuit capable of automatically performing this function is shown in FIG. 5.

Figure 5:
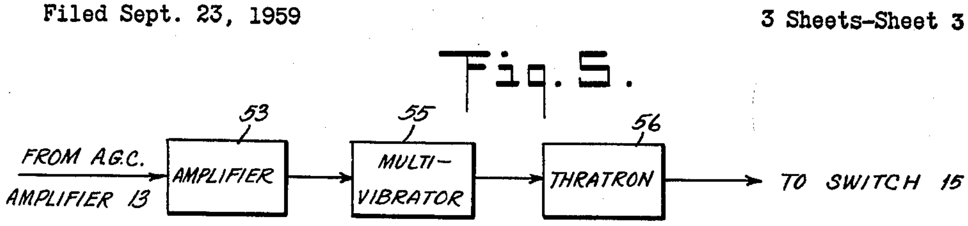
FIG. 5 shows a schematic diagram of one embodiment of the new information bit sensing circuit of FIG. 2.

Referring to FIG. 5, the signal from the automatic gain control amplifier 13 is applied to the input of an amplifier 53. The amplifier 53 has an adequate number of stages to produce a negative going signal at its output when a signal is applied to its input and a positive going output when no signal is applied. The output of the amplifier 53 is connected to a multivibrator 55 which, in a preferred embodiment of the invention, is of the "one-shot" type. The control electrode of a thyratron tube 56 is connected to the output of the multivibrator 55. When a signal indicating a sound is applied to the output of the amplifier 53, the negative signal appearing at the output of the amplifier keeps the multivibrator in a condition such that its output, the signal applied to the thyratron control electrode, is negative going, thereby keeping the thyratron non-conducting. When no signal is applied to the input of amplifier 53, indicating a pause between words, the output of the amplifier 53 goes positive. This positive going wave triggers the multivibrator 55 through a switching cycle wherein the signal applied to the thyratron first goes positive, thereby causing the thyratron to conduct, and then goes back to a condition where the thyratron is de-ionized. When the thyratron conducts the pulse of current produced is used to operate the stepping switch 15, when the switch is of the solenoid operated type. If desired, suitable threshold amplifiers, filters and limiters may be used in the circuit of FIG. 5 to eliminate the switch 15 from being stepped in response to spurious signals. It should be realized that other circuits may be used to perform the function of stepping the switch 15 in response to pauses between words or syllables.

Figure 3:
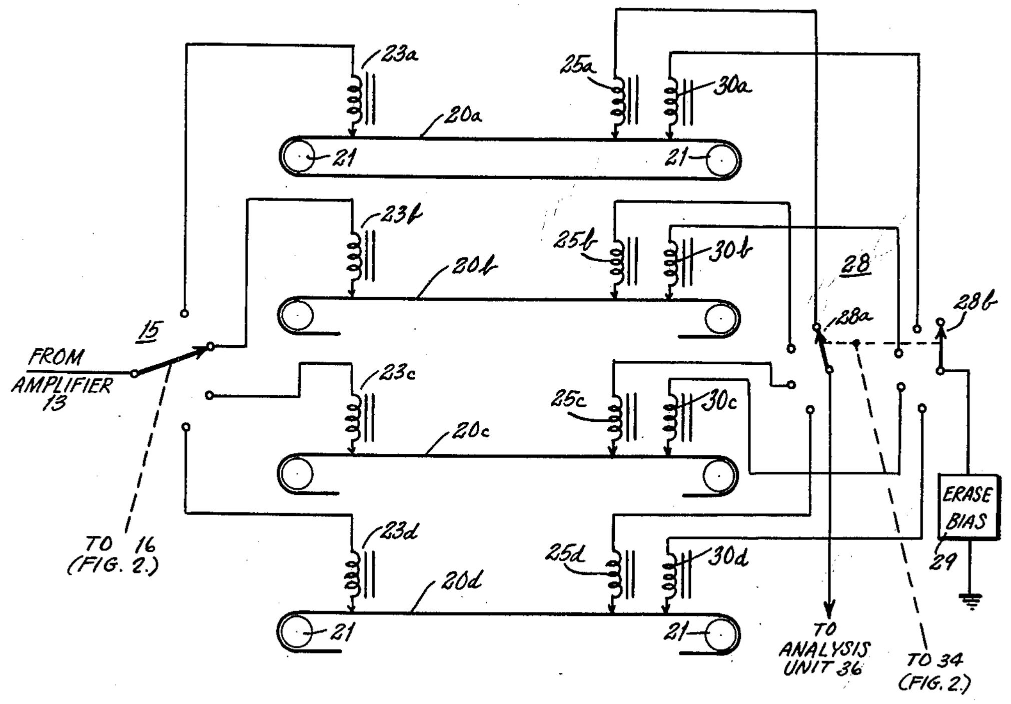
FIG. 3 shows circuit arrangement for the reiterators of FIG. 2.

The outputs of the stepping switch 15 are each connected to a separate reiterator circuit 17 which is shown in detail in FIG. 3. Each of the reiterators 17 stores a bit of the non-recurring information and continuously repeats it, so that the normalized spectrum of the stored bit may be formed. There are as many reiterator circuits 17 provided as is needed to give the system capacity to handle a certain vocabulary. The reiterator circuits 17 each have an endless storage medium. In the referred form of the invention shown, this storage medium is an endless magnetic tape loop 20. It should be realized however, that other types of storage media may also be used, for example, a rotating storage drum, film, etc. The tape loops 20 are each driven by a capstan drive 21 which is connected to a suitable variable speed motor and gearing arrangement (not shown). The tape loops 20 may be individually driven by separate capstans or else an individual capstan and variable speed motor may be provided for each tape.

Associated with each of the magnetic tape loops 20, at one end thereof, is a recording head 23 whose input is connected to one of the output positions of the stepping switch 15. The recording head 23 may be of any type suitable for recording the signals applied to the system on magnetic tape. As a bit of information is picked up by the microphone 11 it is recorded on the magnetic tape 20 by a recording head 23. A separate non-recurring bit of information is recorded on each tape 20 since the stepping switch 15 is shifted to successive output positions by the new bit of information recognition circuit 16, whenever a new bit of information is received by the microphone 11.

In FIG. 3 the stepping switch 15 is shown as being of the mechanical type in which the center arm to which the signal from amplifier 13 is applied, is driven under the control of the signals produced by the new bit of information recognition circuit 16. A mechanical driving arrangement is actuated to step the center arm of the switch 15 to a different output position whenever a recognition signal is supplied from the new bit of information recognition circuit 16. While a mechanically driven stepping switch 15 is shown and described it should be realized that electronic stepping switches may be utilized if desired. Such electronic stepping switches are well known in the art and need not be described here.

Located at the other end of each of the tape loops 20 is a reproducing head 25 which picks up and reproduces the signals recorded on the tape 20. The outputs of each reproducing head 25 is connected to an input position of a second stepping switch 28 which has two sections **28*a* and 28*b*. Switch section 28*a* has the positions for the outputs of the reproducing heads 25, the center arm of this section being connected to a spectrum analysis unit 36, while switch section 28*b* has input positions for an erase bias from a bias source 29 which is supplied from the center arm of this section to an erasing head 30 associated with each tape loop 20**.

The stepping switch 28 is controlled by an "AND" gate 34. When the "AND" gate 34 produces a signal, in a manner to be explained later, the switch 28 is stepped to a new position.

As shown in FIG. 3, the driven elements of the stepping switches 15 and 28 are not coupled together and therefore are not stepped simultaneously. Switch 15 is controlled by the new bit of information recognition circuit 16 and is stepped whenever a new bit of information appears at the input of the microphone 11. Switch 28, at the output of the reiterator circuits 17, is under the control of "AND" gate 34 and it is stepped each time that one of the bits of information previously recorded on one of the reiterator tape loops 20 is analyzed into its characteristic amplitude-frequency spectrum and is identified.

As illustrated in FIG. 3, the center arm of the stepping switch 15 is applying a signal to the recording head **23*b* so that a record is made on tape 20*b*. At the same time, the output of reproducing head 25*a* is connected to an input position of switch section 28*a* so that the signal recorded on the tape 20*a* is supplied to the spectrum analysis unit 36. The center arm of switch section 28*b* is arranged so that it lags the center arm of section 28*a* by one position, and in the position shown in FIG. 3 the center arm of section 28*b* contacts an unconnected switch terminal thereby rendering the erase bias from the erasing circuit 29 ineffective. When, after the recognition of the signal on tape 20***a*, switch 28 is stepped to its next position, the center arm of section 28*b* is moved to a position so that erase bias is supplied to the erasing head 30*a*, thereby erasing the signal recorded on tape 20*a* and preparing it for the reception of a new bit of information. This operation is repeated with respect to each of the tapes 20 so that each of the reiterator circuits 17 may be used over again as successive bits of information are supplied to the system.

The output signal reproduced by a head 25 is applied from the center arm of the switch section 28*a* to the input of the spectrum analysis unit 36 which resolves the signal appearing at the output of switch 28*a* into its characteristic amplitude-frequency spectrum. The spectrum analysis unit 36 is shown in detail in FIG. 4 and is similar to the automatic spectrum identification system disclosed in my aforesaid copending Patent Applications, 790,209 and 822,674.

The signal on the center arm of switch section 28*a*, which is the repeated version of a non-recurring bit of information, is applied to the input of a normalizing amplifier 38. The normalizing amplifier 38 serves to expand or compress the amplitude of the signal so that the frequency components of the spectrum of the signal are normalized in amplitude in accordance with a reference level. This operation is described in detail later.

The normalized output signal from the amplifier 38 is applied to the parallel connected inputs of a bank of filters 40. The filter bank 40 is formed by a number of bandpass filters, constructed of components suitable for the frequency operation, each filter in the bank 40 having a bandpass frequency which is different than the bandpass frequency of the other filters in the bank. The filter bank 40 resolves the signal from the normalizing amplifier 38 into its characteristic amplitude-frequency spectrum. Each of the filters in the bank 40 is designed to pass a different discrete band of frequencies, each band being one of the frequency components of the spectrum resolved from the normalized signal applied to the filter bank. The output of the filter bank 40 is a plurality of alternating current signals appearing on individual output lines, the magnitude of each signal being representative of the magnitude of the frequency component of the spectrum of the signal being resolved. The filters in the bank 40 are arranged so that the alternating current signals, representative of the frequency components of the spectrum, appear in the proper frequency order at the output of the filter banks. In this manner, a "real time" analysis of the spectrum of the normalized signal is made.

Connected to each of the outputs of the filters in the bank 40 is a detector circuit. These detector circuits form a detector bank 42. Each of the detector circuits in the detector bank 42 produces a direct current signal in response to the applied alternating circuit signal from a connected filter in the filter bank 40. The detector circuits in the detector bank 42 may be any of the well known types, for example, a vacuum tube or semi-conductor diode detector, an RC network, etc. The output of the detector bank 42 is a plurality of direct current signals, each of the signals being representative of a frequency component of the spectrum of the signal applied to the system. The magnitudes of the signals produced by the detector circuits of the detector bank 42 correspond to the amplitudes of the frequency components forming the spectrum of the normalized signal being analyzed.

The direct current signals at the output of the detector bank 42 are applied to the inputs of a maximum amplitude selector circuit 44. The maximum amplitude selector 44 selects the maximum amplitude direct current voltage signal which is produced by the detectors of the detector bank 42. The maximum amplitude selector circuit 44 may be any of a number of well known types of circuits. For example, it can be formed by a plurality of "AND" circuits which are arranged so that only the maximum amplitude signal voltage is passed therethrough.

The maximum amplitude voltage selected by the circuit 44 is applied to one input of a difference amplifier 46. The output produced by the difference amplifier 46 is used to control the normalizing amplifier 38, to determine whether the signal from switch section 28*a* is to be expanded or compressed in amplitude. The second input to the difference amplifier 46 is a reference signal supplied from a reference source 48, which may be a battery, adjustable voltage divider, etc. The difference amplifier 46 compares the signal from the maximum amplitude selector 44 with the signal from the reference source 48 and produces an output signal which is dependent upon this comparison. The difference amplifier 46 may, for example, be a twin triode amplifier, the cathodes of the sections of the twin triode being connected together. In the twin triode arrangement the signals from the selector circuit 44 and the reference source 48 are applied to respective grids of the triode sections and the plates of the triodes connected to B+ through a common load resistor. This arrangement operates in a manner such that the output signal produced at the plate load resistor is dependent upon the difference between the two signals applied to the respective grid electrodes. Other suitable types of difference amplifiers may also be utilized. Such amplifiers are well known in the art and need no further description here.

The output signal from the difference amplifier 46 is supplied to the normalizing amplifier 38 so that the incoming signal applied thereto is expanded or compressed in amplitude to the level determined by the reference source 48. The normalizing amplifier 38 in a preferred embodiment of the invention is a tetrode type vacuum tube whose screen grid is connected to the output of the difference amplifier 46. In this arrangement, the signal at the output of the difference amplifier 46 controls the gain of the normalizing amplifier 38 and therefore controls the expansion or compression of the magnitude of the signal applied to the normalizing amplifier 38. Other types of gain control arrangements for the amplifier 38 may also be used. For example, the signal from difference amplifier 46 may be used to control the gain of a transistor amplifier in the well known manner.

As the signal is expanded or compressed by the amplifier 38, each voltage produced at the output of the detector bank 42, a respective voltage being representative of the amplitude of a corresponding frequency component of the spectrum, is normalized in amplitude in accordance with the reference level set by the reference source 48. In this manner, the frequency components of the spectrum are normalized to a predetermined amplitude so that they may be compared with the frequency components of other spectra from known signals, which were previously normalized to the same reference level. By doing this, a direct comparison of the spectrum of the unknown signal, as analyzed by the circuits of FIGURE 4, may be made with spectra of signals from known sources.

The direct current signals at the output of the maximum amplitude selector circuit 44, which are representative of the spectra of the non-recurring bits of information stored by the reiterators 17, are used to drive a teleprinter or other type of readout device 37 which is capable of printing the speech information which was picked by the microphone 11. This may be accomplished in any of a number of ways. For example, referring to FIGURE 4, each output signal from the maximum amplitude circuit 44 is applied to the input of an analog to digital converter 50. The analog to digital converter converts each direct current voltage into a digital number which is representative of the amplitude of that voltage. Stated another way, it may be considered that the direct current voltages from the selector circuit 44 are quantized into a digital number. Circuits for converting direct current analog voltages to digital numbers are well known in the art and need no further description here. For example, see "Digital Computer Components and Circuits," by Richards, Van Nostrand & Company, New York, 1957.

The digital signals formed by the analog to digital converter 50 are then used to operate a typewriter, teleprinter or other type of readout device 37. Each digital number formed by the circuit 50, is representative of a spoken letter, syllable or word. The readout device has a number of keys, each key having a letter, syllable or word placed thereon. Suitable logic circuits are provided to energize a particular key in response to a digital number corresponding to that key. As a number appears at the output of the analog to digital converter 50, it energizes its corresponding key of the readout printer 37 and that particular letter, syllable or word is printed.

When the digital number of the spectrum of the incoming bit of information is formed, signals are produced at the output of the converter 50, which is the output of the spectrum analysis unit 36, and an "AND" gate 34 is conditioned. The "AND" gate 34 produces a signal which steps the switch 28, thereby shifting switch section 28*a* to the next reiterator circuit 17 and starting the analysis of the bit of information stored on the storage medium of that reiterator circuit. In this manner, the bits of information stored on the tapes 20 of the reiterators 17 are successively analyzed and resolved into their corresponding amplitude-frequency spectra and formed into the digital numbers representative of these spectra. As the bit of information on the tape loop 20 of each reiterator circuit 17 is successively analyzed by the spectrum analysis unit 36 and the digital representation for that bit of information is formed by the analog to digital converter 50, a succession of letters, syllables or words are printed to form the complete message spoken into the microphone 11. In this manner the now-recurring signals are directly printed. The digital signals formed for the non-recurring bits of information may also be used to supply operational commands to a computation machine. These digital signals operate the machine in the usual manner.

Another way in which the digital numbers appearing at the output of the analog to digital converter circuit 50 may be used is to directly read out and simultaneously identify the source of the incoming, non-recurring signal which the digital number is representative of. A device which is capable of accomplishing this is shown in the co-pending application of Alan Ross, S.N. 832,645, now abandoned, filed August 10, 1959, entitled "High Speed Digital Readout Device" and assigned to the assignee of this application. In that device the digital number which is representative of the incoming signal is compared with a plurality of reference digital numbers stored on a storage medium which are representative of the sources of known signals. When a comparison is effected, thereby identifying the incoming signal, a light is flashed and the name or designation of the source which produced the matching reference digital number is illuminated, thereby identifying this source. These designations are printed directly on the storage medium for the reference digital numbers. In conjunction with the operation of the present invention, when the name on the storage medium is illuminated, a picture of the illuminated designation is taken and a permanent record made thereof so that the complete message spoken by the operator is recorded.

In the applications of the present invention wherein the signals formed by the circuit 50 are compared with previously recorded signals of known letters, syllables or words, a library may be pre-recorded for a particular operator. For example, the speaking vocabulary of an average operator is approximately 5,000 words. The system of the present invention is first used to analyze each of the 5,000 words into a normalized spectrum and the digital numbers which are representative of these words are formed. These digital numbers are recorded on a storage medium and the digital number which is formed for the spectrum of the incoming word being analyzed is then compared with the 5,000 words stored on the storage medium. This comparison may be effected in a relatively short period of time with the use of high speed magnetic storage drums.

In many cases, the library recorded for one person may serve as a library for a number of persons. As is well known, the voices of different people vary only with respect to pitch and the frequency range of the speech which they utter. Therefore, if all sounds which are supplied to the system are resolved into a spectrum lying in the same pitch and frequency range, one library of pre-recorded information may serve as the library for a number of speakers. This is accomplished in the present invention by the variable speed motors which are used to drive the capstans 21 of the reiterators 17. After the bit of information has been recorded on a tape 20 at the normal tape speed, when the bit of information on that tape is to be analyzed, the motor driving that tape is speeded up or slowed down so that the spectrum of the bit of information being analyzed is made to lie in the same frequency range as the frequency range of the signals in the library. The filters in the filter bank 40 are designed to handle the range of frequencies of the library signals. The speeding up and slowing down of the motors which drive the capstans 21 may be accomplished automatically to place the spectrum in the proper frequency range by simple circuitry, such as a frequency discriminator, which is connected to the output of the stepping switch 28. The discriminator circuit produces a voltage which corresponds to the frequency range in which the frequency components of signal lie and this voltage is used to directly control the speed of the capstan drive motor or to control the motor through a suitable servo-mechanism link. In this manner, the library formed for one person may serve as a library for a number of people.

The use of the variable speed motor which causes the spectrum to be shifted in frequency as desired, also allows the system to be designed with only one set of filters for the filter bank 40, since any spectrum may be shifted in frequency to come within the range of these filters. This arrangement also is useful in operating the system at higher frequencies, thereby eliminating the large circuit components which are necessary at audio frequencies.

Figure 4:
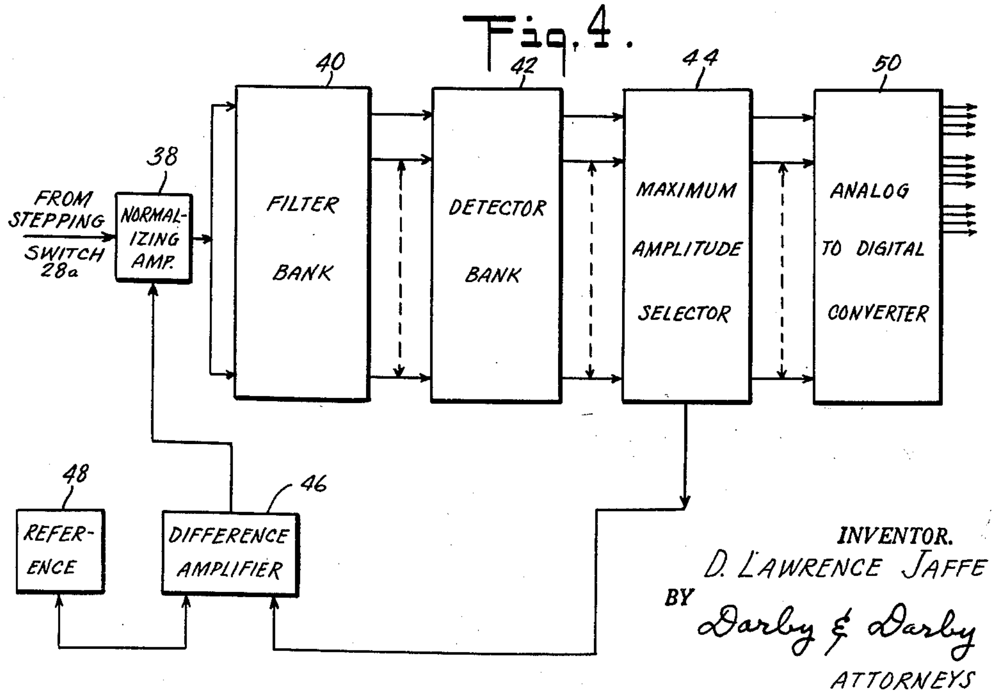
FIG. 4 shows a schematic block diagram of the spectrum analysis unit of FIG. 2.
Figures 6, 7:
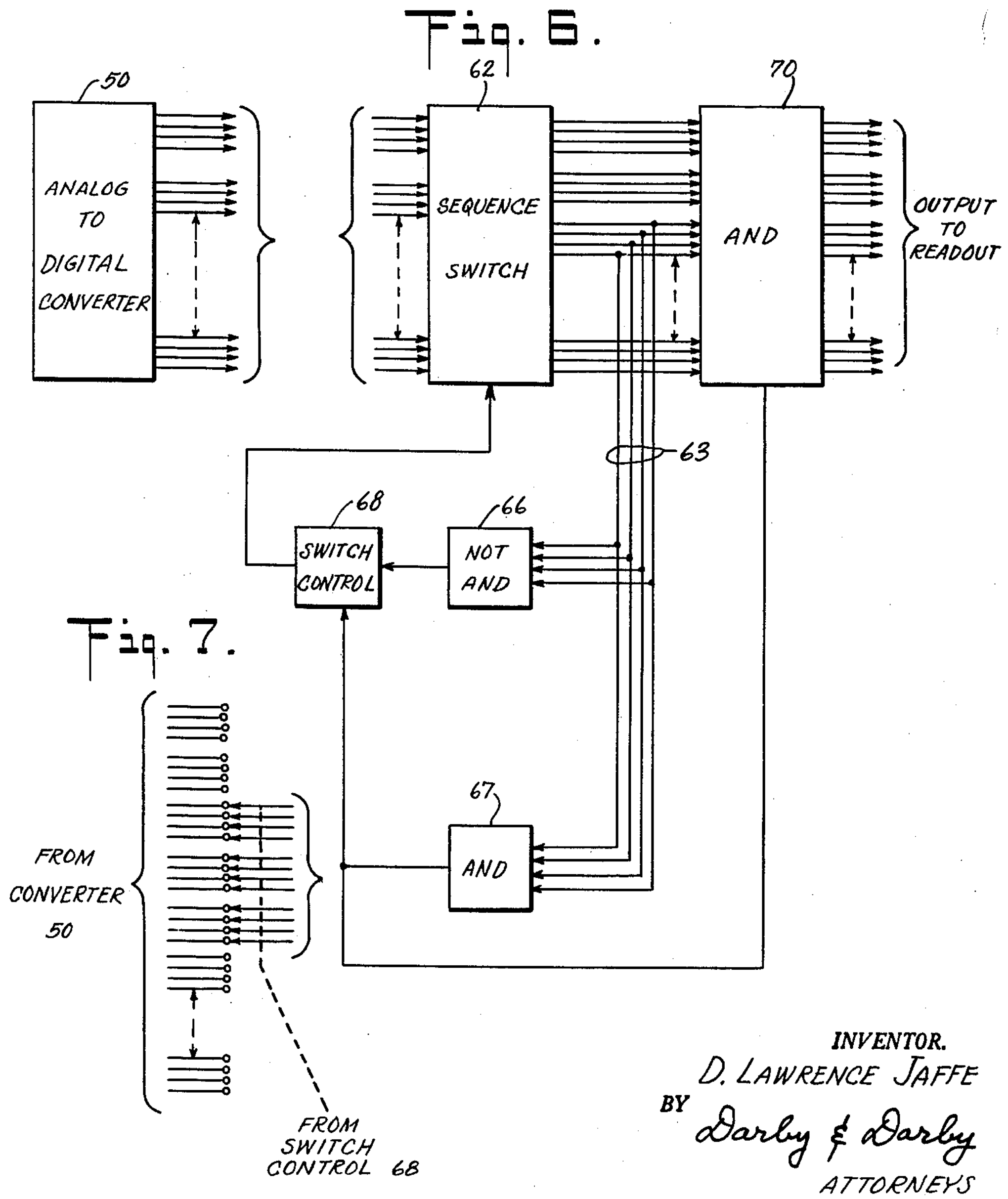
FIG. 6 is a schematic block diagram of a spectrum shifting arrangement for use with the system of the present invention.
FIG. 7 is a schematic diagram of a sequence switch for use with the arrangement shown in FIG. 6.

Referring to FIGURE 6, another arrangement is shown which enables the system of the present invention to recognize a number of different voices which lie in different frequency ranges and have different pitches, and to use a single library for these different voices. As described with respect to FIGURES 1 and 4, one of the frequency components of the spectrum analyzed is of a maximum amplitude, as compared to the other frequency components of the spectrum, and this maximum amplitude frequency component is normalized in amplitude to a reference level. In the system of FIGURE 4, normalized frequency components of the spectrum are converted into a series of digital numbers by means of the analog to digital converter 50. The normalized maximum amplitude-frequency component is converted into the maximum value digital number and the other frequency components are converted into correspondingly smaller digital numbers in accordance with their respective amplitudes. Since the maximum amplitude-frequency component has a voltage of a known reference value, the converter 50 may be arranged to produce a predetermined digital number for this voltage. For example, consider that the converter 50 has a four line output for each digital number representative of a frequency component, thereby allowing the digital representation of arithmetic numbers from one (0001) to fifteen (1111) and that the converter is arranged to produce the digital number fifteen (1111) on one of the sets of output lines in response to the maximum amplitude voltage. It should be realized that converters which produce higher or lower value digital numbers, with corresponding more or less output lines, may also be used. The other frequency components of the spectrum being analyzed have correspondingly smaller digital numbers in accordance with their normalized amplitudes.

Depending upon the frequency range of the incoming signal, and its pitch, the maximum amplitude frequency component will appear at different ones of the filters in the filter bank 40 (FIG. 4) and therefore the maximum digital number fifteen, representative of this frequency component, will be produced at different ones of the sets of output lines of the converter 50. Stated another way, the envelope of the spectrum for a particular word remains the same but the complete spectrum is shifted in frequency depending upon the frequency and pitch of the person speaking. Consider now the library to which the series of digital numbers produced by the converter 50 is to be compared. This library has a plurality of series of digital numbers stored thereon, with the maximum digital number located at a fixed position in each series. The maximum value digital number and the remainder of the series produced by the converter 50 may lie above or below the same series of numbers which is stored in the library due to the different frequency and pitch of the signals forming these numbers. By shifting the series of numbers produced by the converter 50 one way or the other, with respect to the numbers stored in the library, the incoming signal is effectively normalized in frequency. The shifting effectuates an increase or decrease in frequency and pitch to match the frequency and pitch of the numbers stored in the library. Therefore, one library may be utilized for a number of incoming signals of different frequency and pitch.

In FIGURE 6, the digital numbers present on the sets of lines at the output of the converter 50 are applied to the input of a sequence switch 62. The shifting of the number is accomplished by this switch, which is shown in detail in FIGURE 7. The sequence switch 62 receives a plurality of digital numbers over the sets of lines from the converter 50. The switch 62 is of the stepping switch type which has a number of sets of output positions which are varied by a switch control 68 which has a drive motor (not shown). The outputs of the switch 62 are all connected to the input of an "and" circuit 70, the output of which is supplied to the readout device 37. As has been previously stated, one digital number produced by the converter 50 has a maximum value corresponding to the maximum amplitude normalized channel. One of the sets of output lines 63 of the sequence switch 62 is connected to the inputs of a "not and" circuit 66 and an "and" circuit 67. The "not and" circuit 66 is designed to produce an output signal when its input signals are not all the same, that is, when a signal other than a binary 1 is present on one of the input lines. The "and" circuit 67 produces an output signal in response to binary 1's being present on all of its input lines, this condition representing the appearance of the maximum value digital number.

It is on output line set 63 that the maximum digital number is to appear. The library to which the series of digital numbers representative of the analyzed incoming signal is to be compared, is recorded in such a manner that the maximum digital number appears at this position in the libary. In order to normalize the incoming signal in frequency, all that is necessary is to shift the series of digital numbers at the output of the converter 50 until the maximum digital number appears at the predetermined position on output line set 63.

Considering the case where the maximum number is to be the digital number fifteen, the reference source 64 supplies this number to the "not and" circuit 66 and the "and" circuit 67. When the signal on the output line set 63 is not a digital fifteen, the "not and" circuit 66 produces an output signal. "And" circuit 67 produces no output signal at this time. The signal produced by "not and" circuit 66 drives the switch control circuit 68 and steps the sequence switch 62 to a new position so that the series of digital numbers produced by the converter 50 is shifted onto different sets of output lines of the sequence switch 62. The sequence switch 62 is continued to be stepped in this manner until the digital number fifteen appears on the output line set 63. At this time "not and" circuit 66 does not produce an output signal but "and" circuit 67 does. The output signal from "and" circuit 67 is used to stop the stepping motor of the switch 62 and also to open the "and" gate 70, thereby allowing the series of digital numbers to be supplied to the readout device 37. As previously explained, device 37 makes a recognition of the digital number, "and" gate 34 (FIGURE 1) is conditioned, thereby stepping the switch 28*a* to a new position so that the converter 50 is supplied with a new set of signals to convert into a series of digital numbers. The new series of digital numbers is then shifted by the arrangement of FIGURE 6 in the manner previously described. In this manner, the resultant series of digital numbers produced by the converter 50 is normalized with respect to frequency, thereby eliminating variations in absolute pitch.

The system shown in FIGURE 6 can also be used with the direct current signals appearing at the output of the maximum amplitude selector 44, without converting these signals into digital numbers. These direct current signals would be compared with signals stored in an analog library. In this arrangement, the converter 50 would be unnecessary and the "not and" and "and" circuits 66 and 67 would be biased gates.

Therefore, it is seen that a system has been provided which is capable of recognizing and identifying non-recurring signals. The non-recurring signals are formed into their characteristic spectra and signals are produced to identify the spectra. These identification signals are then used to control any type of an electrical, mechanical or electro-mechanical device.

While a preferred embodiment of the invention has been described above it will be understood that this embodiment is illustrative only and the invention is to be limited solely by the appended claims.

It is claimed that:

1. A system for identifying a non-recurring bit of information comprising a storage medium, means for recording a bit of information on said storage medium, means for continuously and repeatedly reproducing the bit of information recorded on said storage medium, means for resolving said repeatedly reproduced bit of information into the frequency components of an amplitude-frequency power spectrum, means responsive to a signal of a predetermined reference amplitude for normalizing the amplitudes of the frequency components of the power spectrum, means for forming signals representative of the amplitudes of the amplitude normalized frequency components of said power spectrum, and a readout means operative in response to said signals for presenting an indication of the identity of the stored non-recurring bit of information.

2. A system for identifying non-recurring information signals occurring in a sequential pattern comprising a plurality of storage media, means for recording an information signal on each of said storage media in the sequence of occurrence, means for continuously and repeatedly reproducing the information signal stored on each of said storage media, and means for resolving each repeatedly reproduced information signal into its characteristic spectrum.

3. A system for identifying non-recurring bits of information occurring in a sequential pattern comprising a plurality of storage media, means for recording a bit of information on each of said storage media in the sequence of occurrence, means for continuously and repeatedly reproducing the bit of information stored on each of said storage media in the sequence of occurrence, a reference source for producing a reference level signal, of a predetermined amplitude, means for resolving each of said reproduced bits of information into the frequency components of its characteristic amplitude-frequency spectrum, means for amplitude normalizing the frequency components of the spectrum in accordance with said reference level signal, means for forming signals representative of the amplitudes of the frequency components of each spectrum, and a readout means operative in response to said signals for presenting an indication of the identity of each reproduced stored bit of non-recurring information.

4. A system for providing a direct indication of non-recurring bits of information occurring in a sequential pattern comprising a plurality of storage media, means for recording information on each of said media, means for energizing each of said recording means in said sequential pattern to record only one non-recurring bit of information on a storage medium, means for continuously and repeatedly reproducing the bit of information stored on one storage medium, means for resolving the repeatedly reproduced bit of information into its characteristic spectrum, means for forming signals representative of the spectrum, means responsive to said signals for producing an indication representative of the identity of said characteristic spectrum, and means responsive to said indication for causing the next bit in the sequence to be repeatedly reproduced.

5. A system for providing a direct indication of non-recurring bits of information occurring in a sequential pattern comprising a plurality of storage media, means for recording information on each of said media, means for energizing each of said recording means in said sequential pattern to record only one non-recurring bit of information on a storage medium, means for continuously and repeatedly reproducing the bit of information stored on one storage medium, means for resolving the repeatedly reproduced bit of information into its characteristic spectrum, means for forming signals representative of each resolved spectrum means responsive to said signals for identifying the spectrum of the reproduced bit and producing a signal when the identification is made, means responsive to said identity signal for causing the next bit in the recorded sequence to be repeatedly reproduced, and a readout means operative in response to said signals of the resolved spectrum for presenting in the same sequence as the sequence of occurrence an indication of the identity of each reproduced stored bit of non-recurring information.

6. A system as set forth in claim 5 wherein each spectrum is normalized in amplitude in accordance with a reference level.

7. A system for providing a direct indication of non-recurring bits of information occurring in a sequential pattern comprising a plurality of storage media, means for recording information on each of said media, means for energizing each one of said recording means in said sequential pattern to record only one non-recurring bit of information on a respective storage medium, means for continuously and repeatedly reproducing the bit of information stored on each of said storage media in the same sequential pattern as the recording took place, a reference source for producing a reference level signal of a predetermined amplitude, means for resolving each repeatedly reproduced bit of information into the frequency components of its characteristic amplitude-frequency spectrum, means for normalizing the amplitudes of the frequency components of each spectrum in accordance with said reference level signal, and means for forming signals representative of the amplitudes of the frequency components of each amplitude normalized spectrum.

8. A system for providing a direct indication of non-recurring bits of verbal information occurring in a sequential pattern comprising a plurality of storage media, means for recording information on each of said media, means responsive to the interval between successive bits of non-recurring verbal information for applying in the sequential pattern of occurrence only one bit of information to each recording means for recording on a storage medium, means for continuously and repeatedly reproducing the bit of information stored on one storage medium, means for resolving the repeatedly reproduced bit of information into its characteristic spectrum, means for forming signals representative of the spectrum, means responsive to said signals for producing an indication representative of the identity of the characteristic spectrum, and means responsive to said indication for causing the next stored bit in the sequence to be repeatedly reproduced.

9. A system for providing a direct indication of non-recurring bits of verbal information occurring in a sequential pattern comprising a plurality of storage media, means for recording information on each of said media, means responsive to the interval between successive bits of non-recurring verbal information for applying in the sequential pattern of occurrence only one bit of information to each recording means for recording on a storage medium, means for continuously and repeatedly reproducing the bit of information stored on one storage medium, a reference source for producing a reference level, means for resolving each repeatedly reproduced bit of information into the frequency components of its characteristic amplitude-frequency spectrum, means for normalizing the amplitudes of the frequency components of each spectrum in accordance with said reference level, means for forming signals representative of the amplitudes of the frequency components of each amplitude normalized spectrum, and means operative in response to said signals for producing an indication of the identity of the reproduced stored bit of non-recurring verbal information, and means responsive to said identification for causing the next recorded bit in the sequence to be reproduced.

10. A system for identifying an incoming signal comprising means for resolving said incoming signal into the frequency components of its corresponding spectrum, said frequency components occurring in a first range of frequencies, means having a plurality of output positions for forming a series of digital signals each of which is representative of a respective frequency component, a digital signal being produced at each of said output positions and a maximum digital signal being formed for the maximum amplitude frequency component of the spectrum, a utilization device having a plurality of input positions, means connecting the output positions of said number forming means to the input positions of said utilization device, and means for shifting the series of digital signals at said output positions so that the maximum digital signal appears at a predetermined input position of said utilization device thereby producing an effective shift of the range of frequencies in which said frequency components occur.

11. A system for identifying a signal comprising means for resolving said signal to the frequency components of its corresponding amplitude-frequency spectrum, said frequency components normally occurring in a first range of frequencies, means having a plurality of outputs for forming a series of digital signals, each digital signal being representative of the amplitude of a respective frequency component and a digital signal being produced at each of said output positions, means for normalizing the amplitudes of the frequency components, said digital signal forming means producing a predetermined maximum digital signal representative of the normalized maximum amplitude frequency component, a utilization device having a plurality of input positions, means connecting the output positions of said digital signal forming means to the input positions of said utilization device, and means for shifting the series of digital signal at said output positions so that the maximum digital signal appears at a predetermined input position of said utilization device thereby producing an effective shift of the range of frequencies in which said frequency components occur.

12. A system for identifying an incoming signal comprising means for resolving said incoming signal into a plurality of frequency components of its corresponding amplitude-frequency spectrum, said plurality of frequency components occurring within a first range of frequencies, means connected to said resolving means for forming a first plurality of signals each of which is representative of the amplitude of a resolved frequency component of a certain frequency means for producing, a second plurality of signals each of which is representative of the amplitude of a frequency component occurring within a second range of frequencies, and means for comparing said first plurality of signals with said second plurality of signals thereby effectively shifting said first plurality of signals into the second range of frequencies for purposes of comparison.

13. A system for identifying an incoming signal comprising means for resolving said incoming signal into a plurality of frequency components of its corresponding amplitude-frequency spectrum, said plurality of frequency components occurring within a first range of frequencies, means connected to said resolving means for forming a first plurality of signals each of which is representative of the amplitude of a resolved frequency component of a certain frequency, means for normalizing the amplitudes of said frequency components to a reference level thereby causing said signal forming means to produce a predetermined signal corresponding to the amplitude of the maximum amplitude frequency component means for producing, a second plurality of signals each of which is representative of the amplitude of a frequency component occurring within a second range of frequencies, and means for comparing said first plurality of signals with said second plurality of signals thereby effectively shifting said first plurality of signals into the second range of frequencies for purposes of comparison.

References Cited in the file of this patent

UNITED STATES PATENTS

| | | |
|---|---|---|
| 2,195,081 | Dudley | Mar. 26, 1940 |
| 2,403,982 | Koenig | July 16, 1946 |
| 2,476,445 | Lacy | July 19, 1949 |
| 2,646,465 | Davis et al. | July 21, 1953 |
| 2,673,893 | Kalfaian | Mar. 30, 1954 |
| 2,685,615 | Biddulph | Aug. 3, 1954 |
| 2,708,688 | Kalfaian | May 17, 1955 |
| 2,866,001 | Smith | Dec. 23, 1958 |
| 2,921,133 | Kalfaian | Jan. 12, 1960 |
| 2,938,079 | Flanagan | May 24, 1960 |
| 2,971,058 | Olson et al. | Feb. 7, 1961 |
| 2,995,727 | Quade | Aug. 8, 1961 |
| 2,998,568 | Schlessel | Aug. 29, 1961 |
| 3,021,479 | Di Toro | Feb. 13, 1962 |

OTHER REFERENCES

The Cathode Ray Sound Spectroscope, article in The Journal of the Acoustical Society of America, September 1949, pp. 527–537.

Radio Frequency Wave Analyzer, article in Tele-Tech, December 1950, pp. 37–40.